(12) United States Patent
Misumi et al.

(10) Patent No.: US 8,446,600 B2
(45) Date of Patent: May 21, 2013

(54) MULTI FUNCTION PERIPHERAL AND METHOD THERFOR

(75) Inventors: Noriko Misumi, Aichi (JP); Ayako Sakai, Aichi (JP); Takahiro Ikeno, Aichi (JP); Masaaki Wakizaka, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 711 days.

(21) Appl. No.: 12/179,041

(22) Filed: Jul. 24, 2008

(65) Prior Publication Data

US 2009/0027721 A1 Jan. 29, 2009

(30) Foreign Application Priority Data

Jul. 26, 2007 (JP) ................................ 2007-194084

(51) Int. Cl.
*G06F 3/12* (2006.01)

(52) U.S. Cl.
USPC .............. 358/1.13; 358/1.15; 399/1; 399/2; 399/81; 399/82

(58) Field of Classification Search
USPC .............. 358/1.15, 1.13, 401; 399/1, 2, 81, 399/82
See application file for complete search history.

(56) References Cited

U.S. PATENT DOCUMENTS

| | | | |
|---|---|---|---|
| 6,606,465 B2 * | 8/2003 | Mutoh et al. | 399/81 |
| 7,898,680 B2 * | 3/2011 | Misawa et al. | 358/1.15 |
| 7,978,359 B2 * | 7/2011 | Koarai | 358/1.15 |
| 2001/0004424 A1 | 6/2001 | Mutoh et al. | |
| 2001/0006382 A1 | 7/2001 | Sevat | |
| 2005/0271429 A1 * | 12/2005 | Tachibana et al. | 399/301 |
| 2006/0101344 A1 | 5/2006 | Tabata | |
| 2006/0274362 A1 | 12/2006 | Kita | |

FOREIGN PATENT DOCUMENTS

| | | |
|---|---|---|
| JP | 7-131575 | 5/1995 |
| JP | 2001469039 | 6/2001 |
| JP | 2003-518831 | 6/2003 |
| JP | 2005-202611 | 7/2005 |
| JP | 2006-135780 | 5/2006 |
| JP | 2006-340259 | 12/2006 |

* cited by examiner

Primary Examiner — Vu B Hang
(74) Attorney, Agent, or Firm — Scully, Scott, Murphy & Presser PC

(57) ABSTRACT

A multi function peripheral with a plurality of functions includes a function selecting unit accepting therethrough an input to select a function to be executed from the plurality of functions, a display unit displaying thereon an information screen showing information on the function selected through the function selecting unit, and a display control unit controlling the display unit to, each time a function is selected through the function selecting unit, display thereon a first information screen showing information on the selected function. When a second information screen showing information on a function in execution has been displayed on the display unit, the display control unit controls the display unit to display thereon the first information screen concurrently with the second information screen.

16 Claims, 9 Drawing Sheets

US 8,446,600 B2

MULTI FUNCTION PERIPHERAL AND METHOD THERFOR

CROSS-REFERENCE TO RELATED APPLICATION

This application claims priority under 35 U.S.C. §119 from Japanese Patent Application No. 2007-194084 filed on Jul. 26, 2007. The entire subject matter of the application is incorporated herein by reference.

BACKGROUND

1. Technical Field

The following description relates to one or more multi function peripherals.

2. Related Art

Conventionally, a display device has been known that has two or more display areas sectioned to display therein respective different images. For example, Japanese Patent Provisional Publication No. 2003-518831 (hereinafter referred to as '831 Publication) discloses a display device that always has two display areas that are evenly sectioned and arranged horizontally side by side. When user operations are applied individually to the two display areas, different images are displayed in the two display areas, respectively. Additionally, a multi function peripheral (MFP) has been known that has a plurality of functions such as a facsimile function, a printer function, a scanner function, and a copy function.

SUMMARY

For example, it is assumed that the aforementioned MFP is provided with the display device disclosed in '831 Publication that has display areas sectioned to correspond to the number of functions of the MFP. Further, it is assumed that the MFP is configured such that a user can individually operate the functions thereof with reference to the sectioned display areas of the display device thereof. However, since the display device provided to the MFP has a limited size, it might cause undesired problems that the sectioned display areas are too small to provide comfortable viewability and easy operability when the display device is configured as a touch panel.

Aspects of the present invention are advantageous to provide one or more improved multi function peripherals that allow a user to easily operate each function thereof even though a plurality of functions thereof are concurrently executed.

According to aspects of the present invention, a multi function peripheral having a plurality of functions is provided, which multi function peripheral includes a function selecting unit configured to accept therethrough an input to select a function to be executed from the plurality of functions, a display unit configured to display thereon an information screen showing information on the function selected through the function selecting unit, and a display control unit configured to control the display unit to, each time a function is selected through the function selecting unit, display thereon a first information screen showing information on the selected function. When a second information screen showing information on a function in execution has been displayed on the display unit, the display control unit controls the display unit to display thereon the first information screen concurrently with the second information screen.

In some aspects of the present invention, each time a function is selected through the function selecting unit, an information screen (first information screen) corresponding to the selected function is displayed on the display unit. Further, when an information screen (second information screen) of a function in execution has already been displayed on the display unit, the first information screen of the selected function is displayed on the display unit concurrently with the second information screen of the function in execution. Accordingly, when a plurality of functions are executed at the same time, the respective information screens of the executed functions are displayed at the same time. Therefore, it is convenient that the respective information screens of the executed functions can provide more comfortable viewability and easier operability than the case where information screens of all functions have previously been displayed on the display unit at the same time. In particular, the more limited size the display unit has, the more remarkable the aforementioned effects are.

According to another aspect of the present invention, a method to control a multi function peripheral having a display unit is provided, which method includes a function selecting step of selecting a function to be executed from a plurality of functions of the multi function peripheral, a display step of displaying on the display unit an information screen showing information on the function selected in the function selecting step, and a display control step of controlling the display unit to, each time a function is selected in the function selecting step, display thereon a first information screen showing information on the selected function. In the display control step, when a second information screen showing information on a function in execution has been displayed on the display unit, the display unit is controlled to display thereon the first information screen concurrently with the second information screen.

With the method configured as above, the same effects as the multi function peripheral can be provided.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intterminated to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Figure 1:
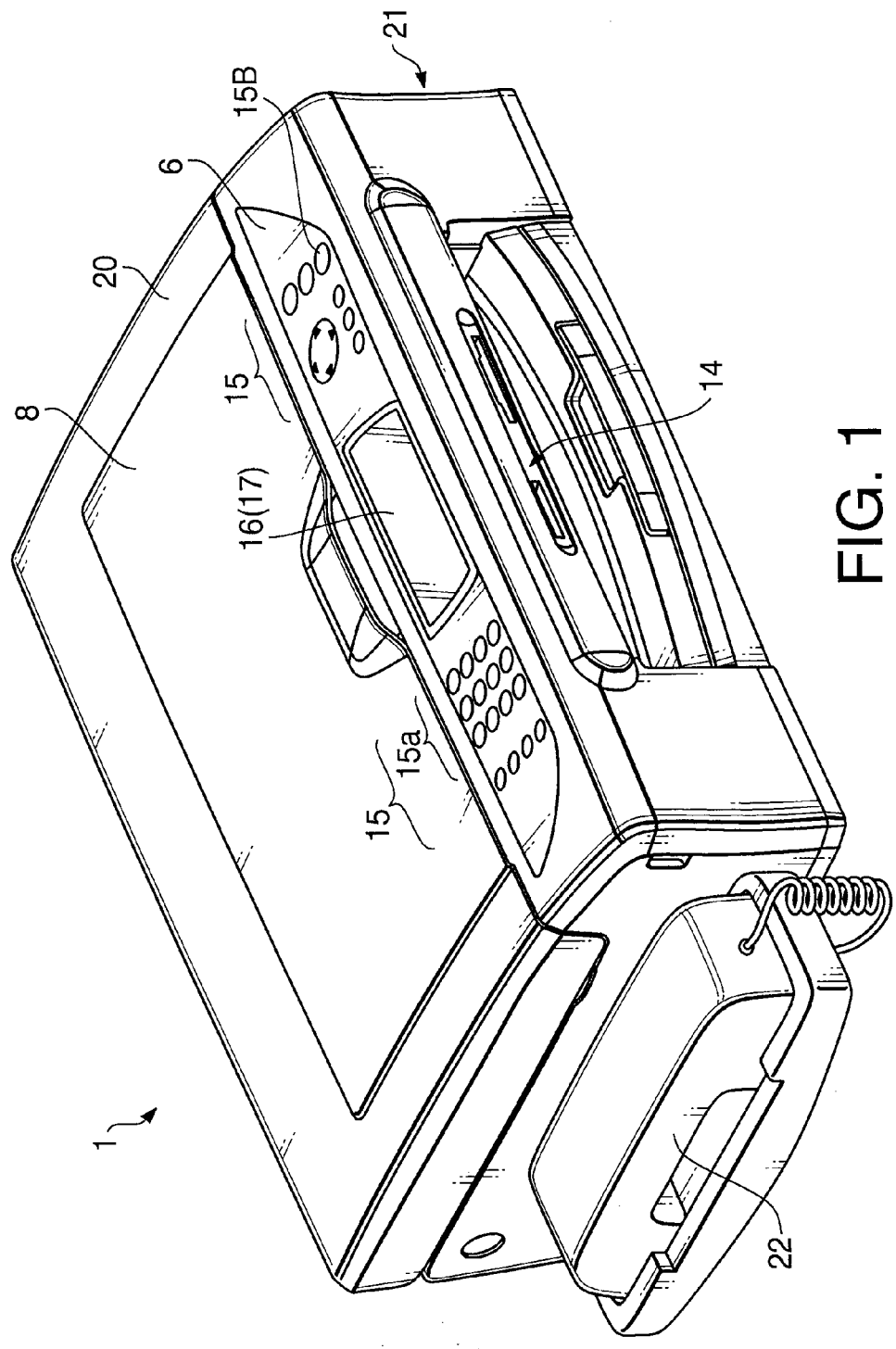
FIG. 1 is a perspective view schematically showing an external view of a multi function peripheral (MFP) in an embodiment according to one or more aspects of the present invention.

Hereinafter, an embodiment according to aspects of the present invention will be described with reference to the accompany drawings. FIG. 1 is a perspective view showing an appearance configuration of a multi function peripheral 1 (hereinafter referred to as an MFP 1) in an embodiment according to aspects of the present invention.

The MFP 1 has various functions such as a telephone function, facsimile function, PC print function, media print function, scanner function, and copy function. Further, the MFP 1 is connected with a phone line network 100 (see FIG. 2) to attain voice communication with the telephone function and data communication with the facsimile function.

The MFP 1 can concurrently perform a plurality of functions that never interact with each other in execution. When a plurality of functions are concurrently performed, respective operation screens for operating the functions in execution are displayed on an LCD 16 at the same time.

At an upper portion of the MFP 1, a scanner 20 is disposed that is configured to scan a document in execution of the facsimile function, scanner function, or copy function. Under a document cover 8, a loading glass plate is provided that is configured to be loaded with the document. When the document is scanned, the document cover 8 is opened up, the document is placed on the loading glass plate, and the document cover 8 is closed to fix the document.

Then, when an instruction to scan the document is issued by a user, an image on a document sheet is scanned by a sensor (not shown) provided under the loading glass plate to scan the document. Image data as scanned is stored in a predetermined memory area of a below-mentioned RAM 13 (see FIG. 2).

In addition, a printer 21, which is configured to print an image on a recording paper with a so-called inkjet printing method, is incorporated in a housing of the MFP 1. The printer 21 includes a printing head using ink of four colors cyan (C), magenta (M), yellow (Y), and black (K), a paper feeding device, and a restoring device so as to attain color printing. The printing head is provided with a plurality of nozzles (ink discharge outlets). Thus, the printer 21 prints an image on a recording paper being fed by the paper feeding device while the nozzles discharge ink.

A horizontally-long operation panel 6 is provided in front of the document cover 8, which includes operation keys 15, the LCD 16, and a touch panel 17. The operation keys 15 include various buttons such as numeric buttons 15a for inputting therethrough a telephone number in use of the telephone function or facsimile function, and a power button 15b for taking ON/OFF control of the MFP 1 therewith. The LCD 16 displays thereon a function selecting screen (see FIG. 7B) for specifying a user-desired function, an operation procedure, a status of a process in execution, and information corresponding to operation of the operation keys 15 or touch panel 17.

As will be described in detail later, the function selecting screen (see FIG. 7B) includes a PC Print button BT1 for instructing the PC print function to be executed, a Media Print button BT2 for instructing the media print function to be executed, a Scan button BT3 for instructing the scanner function to be executed, a Phone button BT4 for instructing the telephone function to be executed, a Fax button BT5 for instructing the facsimile function to be executed, a Copy button BT6 for instructing the copy function to be executed, and a Cancel button CB for canceling displaying of the function selecting screen.

Additionally, the touch panel 17 is disposed on a display surface of the LCD 16, as a kind of input device. Specifically, when the function selecting screen is displayed on the LCD 16, the touch panel 17 disposed on the display surface of the LCD 16 is operated through touching one of the buttons BT1 to BT6 with a finger of the user. Then, when the touch panel detects a position thereon touched by the user, the MFP1 determines that a button corresponding to the touched position is pressed, and performs a corresponding function.

On a front face of the MFP 1, there is provided a memory card slot 14 into which a memory card 14a (see FIG. 2) is inserted. When the memory card 14 is inserted in the memory card slot 14, the user can cause the LCD 16 to display thereon images based upon image data stored on the memory card 14a, select a desired one of the images displayed, and print the selected image with the printer 21. In addition, the memory card 14a can store thereon image data obtained through a scanning operation by the scanner 20. The memory card 14a may include a CompactFlash (trademark registered), SmartMedia (trademark registered), Memory Stick (trademark registered), SD card (trademark registered), and xD (trademark registered).

A handset 22 is provided at a side portion of the MFP 1. The handset 22 is used when the user utilizes the telephone function to perform voice communication with an external device connected via the phone line network 100 (see FIG. 2). When the user does not utilize the telephone function, the handset 22 is placed on a cradle provided with a hook (not shown). Meanwhile, when the user utilizes the telephone function, the handset 22 is picked up from the cradle and used. It is noted that the former state where the handset 22 is placed on the cradle is referred to as an on-hook state, and the latter state where the handset 22 is picked up from the cradle is referred to as an off-hook state. The handset 22 is electrically connected with an NCU 23 (see FIG. 2) in the off-hook state, while the electrical connection of the handset 22 with the NCU 23 is released in the on-hook state.

Figure 2:
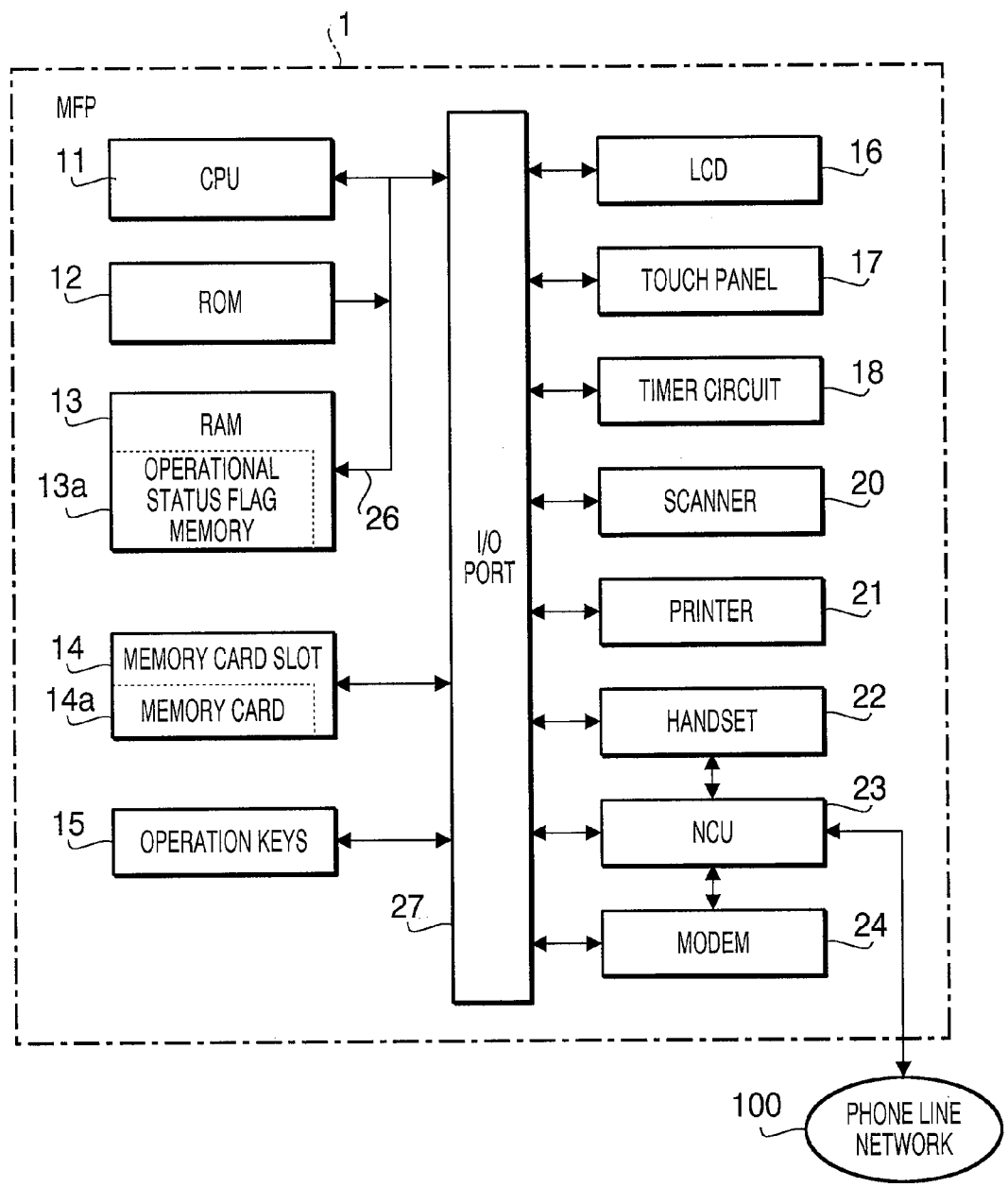
FIG. 2 is a block diagram showing an electrical configuration of the MFP in the embodiment according to one or more aspects of the present invention.

Subsequently, an electrical configuration of the MFP 1 will be described with reference to FIG. 2. FIG. 2 is a block diagram showing an electrical configuration of the MFP 1. The MFP 1 includes a CPU 11, a ROM 12, the RAM 13, the memory card slot 14, the operation keys 15, the LCD 16, the touch panel 17, a timer circuit 18, the scanner 20, the printer 21, the handset 22, the NCU 23, and a modem 24.

The CPU 11, ROM 12, and RAM 13 are interconnected via a bus line 26. Additionally, the memory card slot 14, operation keys 15, LCD 16, touch panel 17, timer circuit 18, scanner 20, printer 21, handset 22, NCU 23, modem 24, and bus line 26 are interconnected via an I/O port 27.

Figure 4:
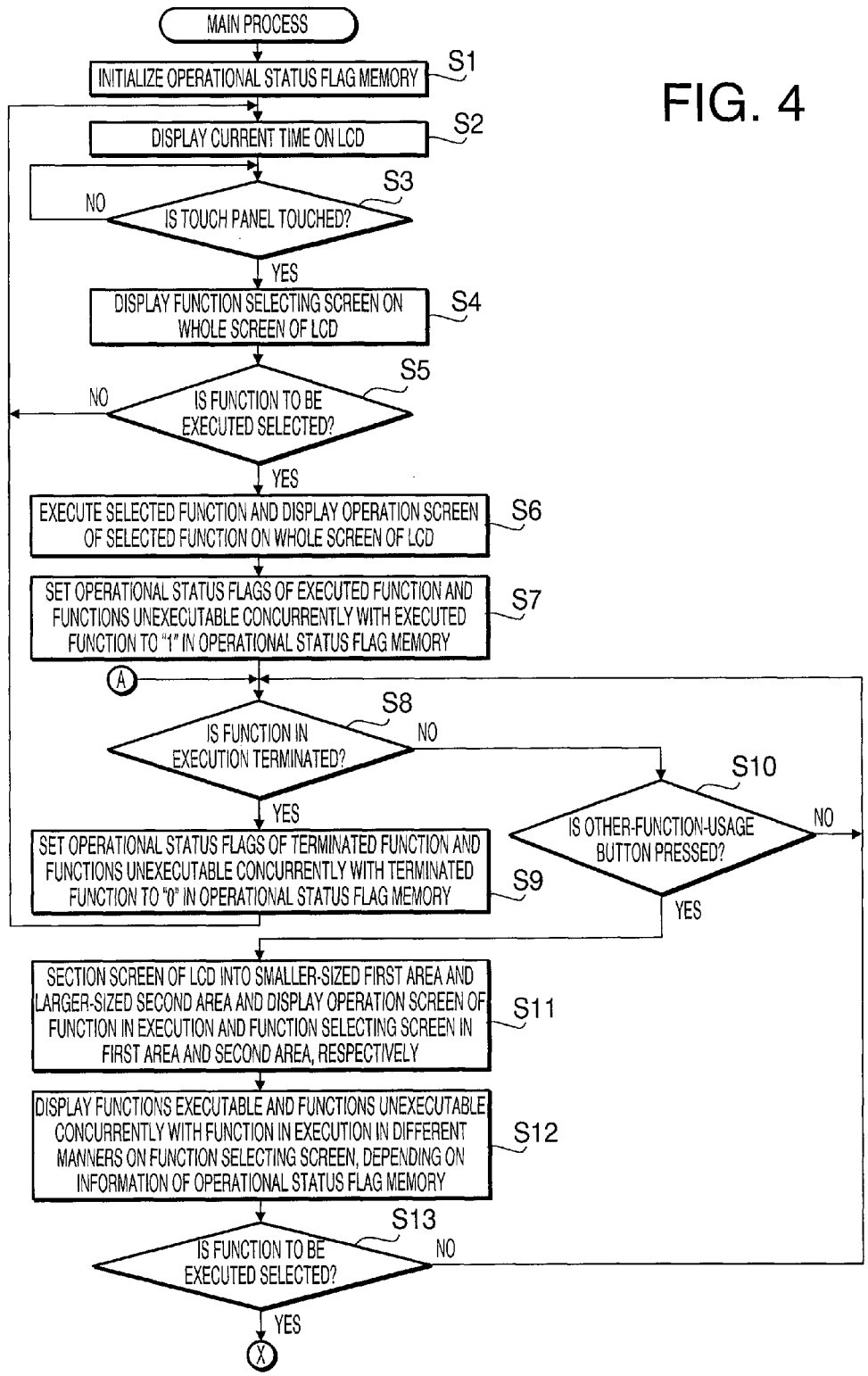
FIGS. 4 to 6 are flowcharts showing a procedure of a main process of the MFP in the embodiment according to one or more aspects of the present invention.
Figure 5:
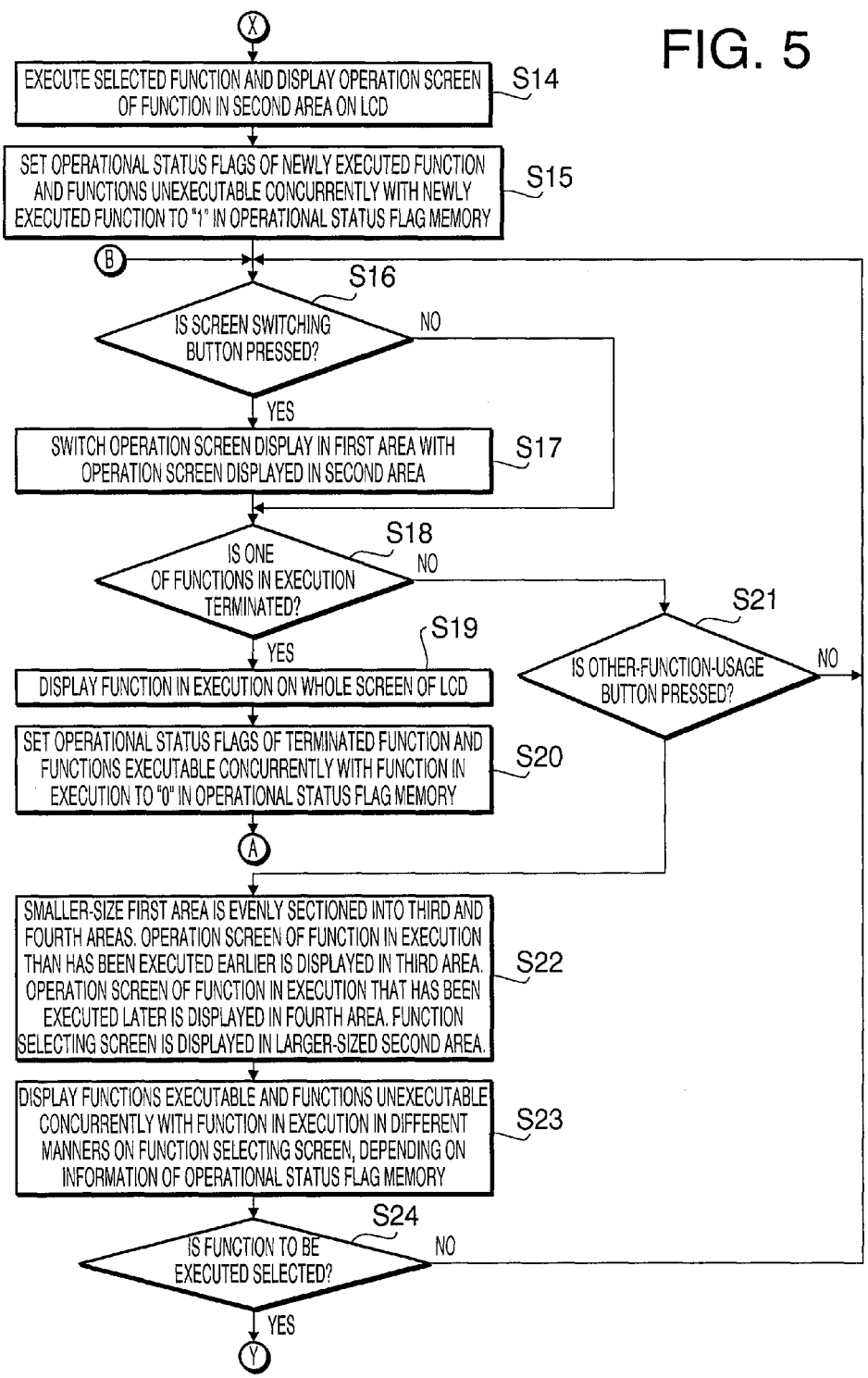
Figure 6:
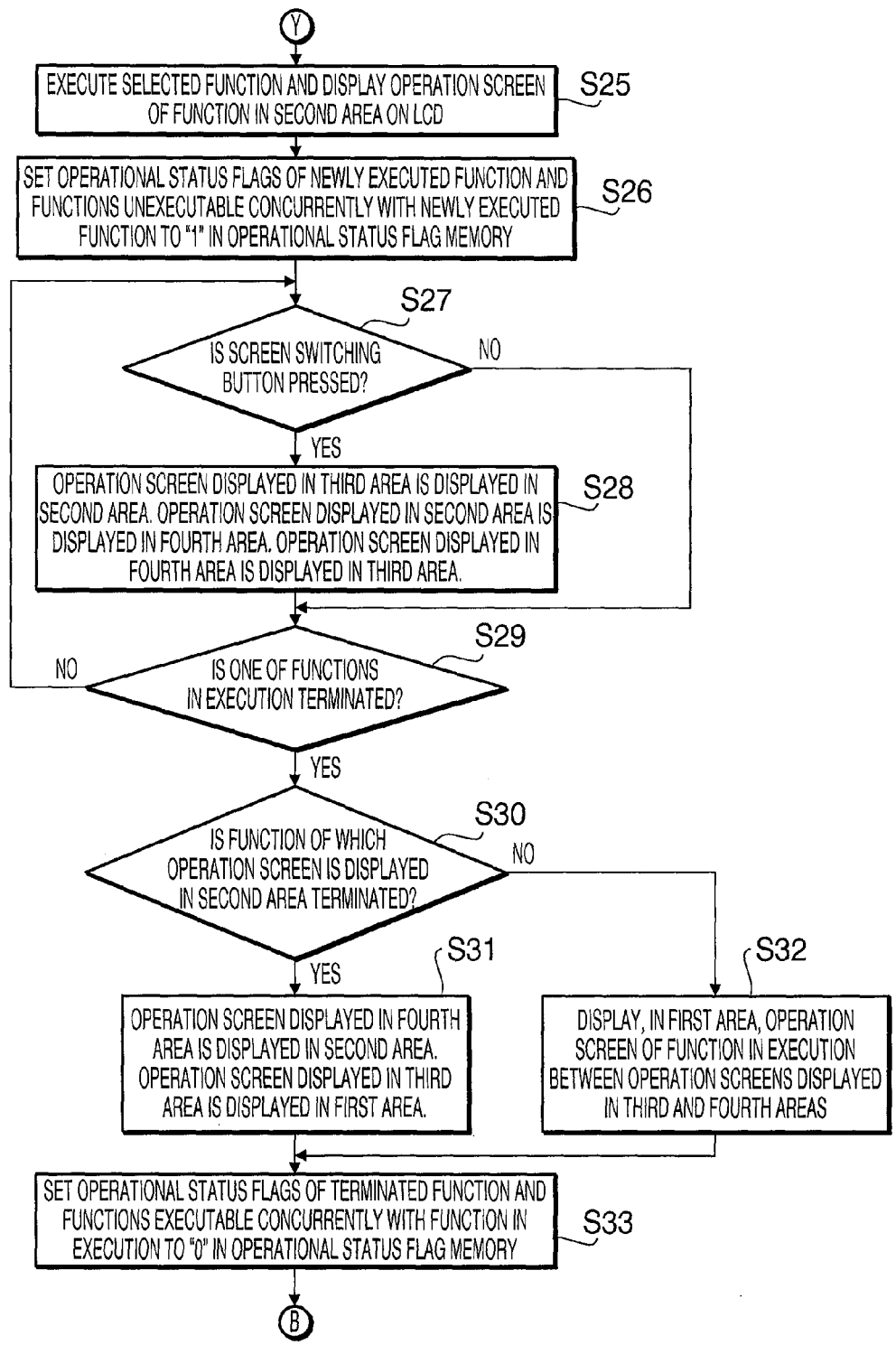

The CPU 11 is configured to control various functions of the MFP 1 and portions of the MFP 1 that are connected with the I/O port 27 in accordance with constant values and/or programs stored on the ROM 12 and/or RAM 13, or various signals transmitted and received via the NCU 23. The ROM 12 is a non-rewritable memory that stores thereon a control program to be executed by the MFP 1. A program for executing a main process shown in a flowchart of FIGS. 4 to 6 is stored in the ROM 12.

The RAM 13 is a rewritable volatile memory that temporarily stores thereon various data while the MFP 1 is under operation. The RAM 13 is provided with an operational status flag memory 13a that stores thereon, for each function, an operational status flag representing whether each function is executable.

Figure 3:
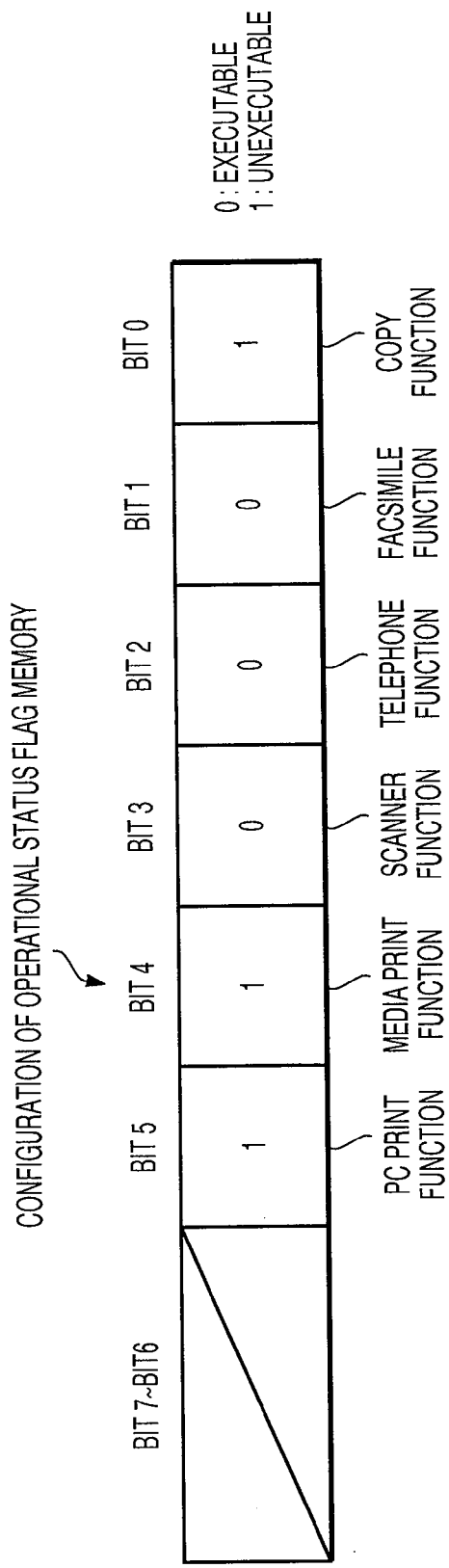
FIG. 3 is a schematic diagram exemplifying a configuration of an operational status flag memory in the embodiment according to one or more aspects of the present invention.

The operational status flag memory 13a will be described with reference to FIG. 3. FIG. 3 is a schematic diagram exemplifying a configuration of the operational status flag memory 13a. As illustrated in FIG. 3, the operational status flag memory 13a is configured with 8 bits (1 byte) of a bit 0 to a bit 7. Each of the bit 0 to the bit 5 is an operational status flag representing whether a corresponding function is executable. Specifically, the bit 0 represents whether the copy function is executable, and the bit 1 represents whether the facsimile function is executable. Further, the bit 2 represents whether the telephone function is executable, and the bit 3 represents whether the scanner function is executable. Additionally, the bit 5 represents whether the PC print function is executable.

When an operational status flag is set to "0," it represents that a function corresponding to the operational status flag is executable. Meanwhile, when an operational status flag is set to "1," it represents that a function corresponding to the operational status flag is not executable. FIG. 3 denotes that the scanner function, telephone function, and facsimile function are executable, and that the PC print function, media print function, and copy function are not executable.

When a function is executed by the user, the operational status flag of the function is set to "1," and additionally, the operational status flags of the unexecutable functions unexecutable concurrently with the function in execution are set to "1." Meanwhile, when the function in execution is terminated, the operational status flag of the function in execution is set to "0," and further, the operational status flags of the unexecutable functions, as well as the function in execution, are set to "0."

For example, when the PC print function is executed by the user in a state where none of the functions is in execution, the operational status flag of the PC print function is set to "1 (unexecutable)." Since the PC print function can be attained by using the printer 21, the operational status flags of other functions using the printer 21 such as the media print function and copy function are set to "1 (unexecutable)."

When the PC print function in execution is terminated, the operational status flag of the PC print function is set to "0 (executable)," and the operational status flags of the media print function and copy function are set to "0 (executable)" as well.

Back to FIG. 2, the timer circuit 18 is a commonly-known circuit configured to have a clock function measuring a current date and time. The NCU 23 is connected with the phone line network 100 and configured to take controls of transmitting a dial signal to the phone line network 100 and responding a call signal from the phone line network 100. The modem 24 modulates image data instructed by the facsimile function to be sent into a signal transmittable to the phone line network 100 and sends the modulated signal via the NCU 23. The modem 24 also receives an inputted signal from the phone line network 100 via the NCU 23, and demodulates the received signal into image data that can be displayed on the LCD 16 and/or printed with the printer 2.

Next, referring to FIGS. 4 to 6, a main process to be executed by the CPU 11 of the MFP 1 will be described. FIGS. 4 to 6 are flowcharts showing a main process of the MFP 1. In the main process, each time a function having no influence on a function in execution is executed by the user, the operation screen of the function executed and the operation screen of the function already in execution are concurrently displayed on the LCD 16. The main process is repeatedly performed until a main power supply of the MFP 1 is powered off after the main power supply is powered on.

Figure 7A:
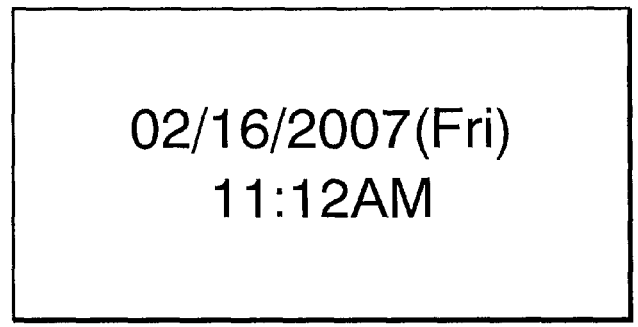
FIG. 7A is a schematic diagram exemplifying a standby screen in the embodiment according to one or more aspects of the present invention.

In the main process, firstly, the operational status flag memory 13a is initialized (S1), and a standby screen such as a date-and-time display is displayed (S2). FIG. 7A is a schematic diagram exemplifying a standby screen. As illustrated in FIG. 7A, the standby screen displays thereon the current date and time obtained by the timer circuit 18.

Subsequently, the CPU 11 waits ready for the touch panel 17 to be touched by the user (S3: No). When the touch panel 17 is touched by the user (S3: Yes), the function selecting screen for selecting a function to be executed by the user is displayed on a whole screen of the LCD 16 (S4).

Figure 7B:
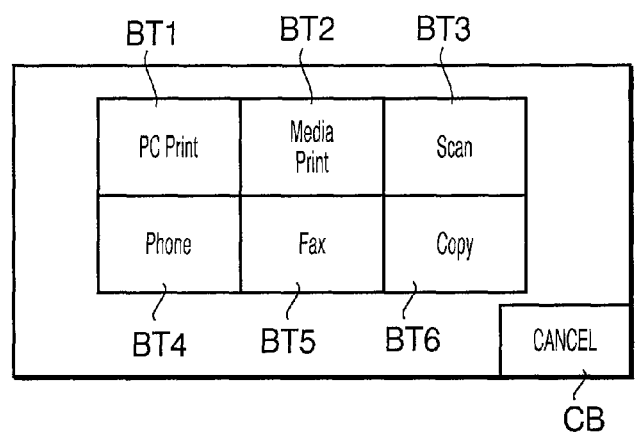
FIG. 7B is a schematic diagram exemplifying a function selecting screen in the embodiment according to one or more aspects of the present invention.

The function selecting screen will be explained with reference to FIG. 7B. FIG. 7B is a schematic diagram exemplifying a function selecting screen. The function selecting screen is configured such that the user instructs the MFP 1 to execute each function thereon. The user can concurrently perform a plurality of functions having no influence on a function in execution through an input operation on the function selecting screen.

The function selecting screen includes the PC print button BT1 to instruct the MFP 1 to execute the PC print function, the Media Print button BT2 to instruct the MFP 1 to execute the media print function, the Scan button BT3 to instruct the MFP 1 to execute the scanner function, the Phone button BT4 to instruct the MFP 1 to execute the telephone function, the Fax button BT5 to instruct the MFP 1 to execute the facsimile function, the Copy button BT6 to instruct the MFP 1 to execute the copy function, and the Cancel button CB to cancel the display of the function selecting screen.

When each of the buttons BT1 to BT6 is touched by the user, the MFP 1 executes a function corresponding to the touched button. For example, when the Phone button BT4 is touched by the user, the MFP 1 performs the telephone function.

Back to the flowchart in FIG. 4, when the step S4 is completed, it is determined whether any function to be executed is selected by the user pressing a corresponding one of the buttons BT1 to BT6 (S5). In this case, when to select a function is canceled by the user pressing the Cancel button CB, or any function is not selected after a predetermined time period (e.g., 30 seconds) has elapsed (S5: No), the present process goes back to S2, in which the steps of S2 to S5 are repeated.

Meanwhile, when a function to be executed is selected by the user (S5: Yes), the MFP 1 performs the function selected by the user and causes the LCD 16 to display an operation screen of the selected function on the whole screen thereof (S6). Then, the CPU 11 of the MFP 1 sets the operational status flags of the executed function and functions unexecutable concurrently with the executed function to "1" (S7).

Figure 7C:
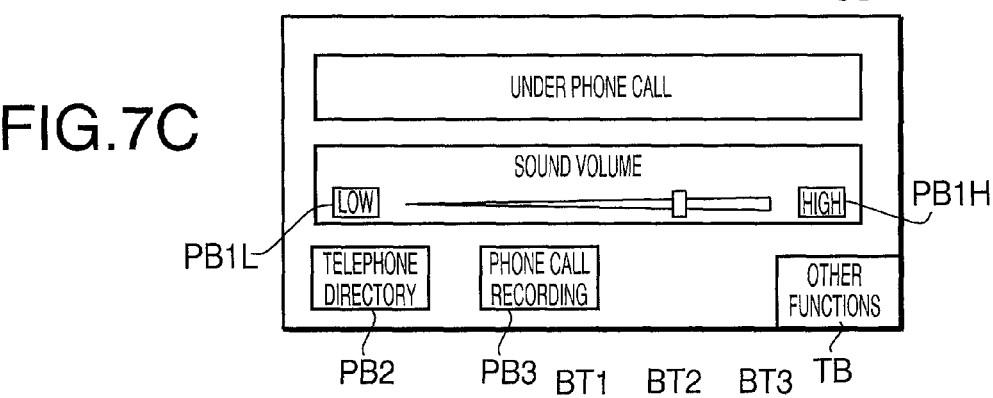
FIG. 7C is a schematic diagram exemplifying an operation screen of a telephone function in the embodiment according to one or more aspects of the present invention.

For example, when the Phone button BT is pressed by the user on the function selecting screen as shown in FIG. 7B, the telephone function is executed by the MFP1, and the operation screen of the telephone function is displayed on the whole screen of the LCD 16 as shown in FIG. 7C.

FIG. 7C is a schematic diagram exemplifying an operation screen of the telephone function. As shown in FIG. 7C, there are provided on the operation screen of the telephone function, sound volume control buttons PB1L and PB1H for controlling a sound volume of voice communication, a telephone directory button PB2 for displaying previously registered telephone numbers, a recording button PB3 for recording voice communication. By operating the above buttons, the user can provide settings and operations for the telephone function. It is noted that, whenever an operation screen is displayed on the whole screen of the LCD 16, an other-function-usage button TB for displaying the function selecting screen is provided.

In the operational status flag memory 13a, the operational status flag of the telephone is set to "1 (unexecutable)." Further, the operational status flag of another function (facsimile function) using the NCU 23 is set to "1 (unexecutable)" as well.

Namely, the operational status flags of the executed function (telephone function) and the function (facsimile function) unexecutable concurrently with the executed function are set to "1," and the functions of which the operational status flags are set to "1" are prohibited to be executed (set to be unselectable in the present embodiment). Thereby, it is possible to avoid that two or more operation screens for the same function are displayed on the LCD 16. In addition, it is possible to concurrently execute two or more other functions that have no influence on the function in execution.

Back to the flowchart in FIG. 4, when the step S7 is completed, it is determined whether the function in execution is completed (S8). When the function in execution is terminated (S8: Yes), in the operational status flag memory 13a, the operational status flags of the terminated function and the functions unexecutable concurrently with the terminated function are set to "0" (S9). Then, the present process goes back to S2, and the aforementioned steps of S2 to S9 are repeated. In S8, when the function in execution has not been terminated, namely, the function is still in execution (S8: No), it is determined whether the other-function-usage button TB is pressed by the user (S10). When the other-function-usage button TB is not pressed (S10: No), the present process goes back to S8, and the steps of S8 to S10 are repeated.

Meanwhile, when the other-function-usage button TB is pressed (S10: Yes), the screen of the LCD 16 is divided into a first area (see FIG. 7D) with a smaller area size and a second area with a larger area size. Then, the operation screen of the function in execution is displayed in the first area, and the function selecting screen is displayed in the second area (S11). Depending on information on the operational status flag memory 13a, in the function selecting screen, buttons of executable functions and the buttons of the functions unexecutable concurrently with the function in execution are displayed in different manners, respectively (S12).

Figure 7D:
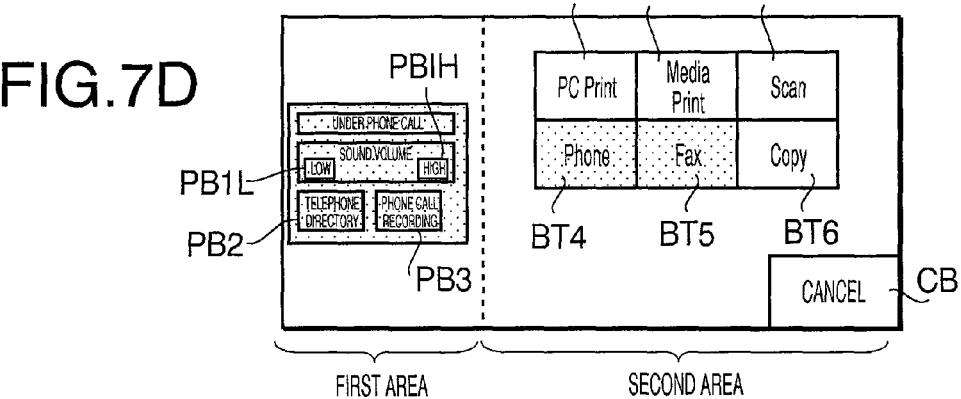
FIG. 7D is a schematic diagram exemplifying a display screen on which the operation screen of the telephone function and the function selecting screen are concurrently displayed in the embodiment according to one or more aspects of the present invention.

For instance, as shown in FIG. 7C, when the telephone function is only executed in the MFP 1, and the other-function-usage button TB is pressed by the user, the screen of the LCD 16 is sectioned, and the operation screen of the telephone function and the function selecting screen are concurrently displayed as illustrated FIG. 7D.

FIG. 7D is a schematic diagram exemplifying a display screen on which the operation screen of the telephone function and the function selecting screen are concurrently displayed. As shown in FIG. 7D, the screen of the LCD 16 is sectioned into the smaller-sized first area and the larger-sized second area. The telephone function in execution is in the first area, and the function selecting screen is displayed in the second area.

Even though an operation screen of a single function (telephone function) is being displayed, namely, a single function is in execution, it is convenient for the user to be able to concurrently display on the LCD 16 the operation screen of the function in execution (telephone function) and function selecting screen by pressing the other-function-usage button TB.

Then, the status of the operational status flag of each function is read from the operational status flag memory 13a, and it is determined whether each function is executable. Specifically, the functions of which the operational status flags are set to "0" (the PC print function, media print function, scanner function, and copy function) are determined to be executable. On the function selecting screen displayed in the second area, the buttons BT1 to BT3, and BT6 of the executable functions (the PC print function, media print function, scanner function, and copy function) and the buttons BT3 and BT4 of the functions unexecutable concurrently with the function in execution (the telephone function and facsimile function) are displayed in manners different therebetween. In the present embodiment, the buttons of the executable functions are whitely displayed, while the buttons of the unexecutable functions are blackly displayed.

Hence, on the function selecting screen, the buttons BT1 to BT3, and BT6 of the executable functions (the PC print function, media print function, scanner function, and copy function) and the buttons BT3 and BT4 of the functions unexecutable concurrently with the function in execution (the telephone function and facsimile function) are displayed in manners different therebetween. Therefore, it is convenient for the user to be able to, at a glance, recognize the executable functions and the unexecutable functions by confirming how the buttons BT1 to BT6 are displayed.

Additionally, since the function selecting screen is displayed in the larger-sized second area, it is convenient for the user to be able to recognize the executable functions and the unexecutable functions and select a function to be newly executed on the large easily-viewable function selecting screen.

As a modification of the present invention, the function selecting screen may be configured to display thereon only the buttons of the executable functions such that the user can confirm the executable functions. In this case, since the buttons of the unexecutable functions are not displayed on the function selecting screen, the user might misunderstand that the MFP 1 is not provided with the unexecutable functions of which buttons are not displayed. Thus, with respect to each of the functions, whether it is executable or unexecutable is desired to be displayed. It can prevent the user from misunderstanding that the MFP 1 does not have the unexecutable functions of which buttons are not displayed.

Bach to the flowchart in FIG. 4, when the step S12 is completed, one of the buttons of the executable functions is pressed by the user, it is determined whether a function to be executed is selected (S13). In S13, when to select a function is canceled by the user pressing the cancel button CB, or any function to be executed is not selected after a predetermined time period (e.g., 30 seconds) has elapsed (S13: No), the present process goes back to S8, and the aforementioned steps of S8 to S113 are repeatedly performed. It is noted that when one of the buttons of the unexecutable functions is pressed in S13, no operation is performed and the step S113 is repeated.

Alternatively, it may be displayed on the LCD 16 that a function selected by the user is unexecutable, and the user may be informed of it. Meanwhile, when a function to be executed is selected by the user (S13: Yes), the MFP 1 executes the selected function, and the operation screen of the function is displayed in the second area on the LCD 16 (S14). Then, in the operational status flag memory 13*a*, operational status flags of the newly executed function and functions unexecutable concurrently with the newly executed function are set to "1" (S15).

Figure 8A:
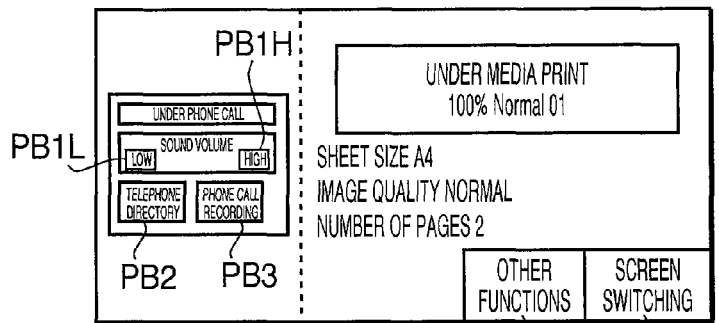
FIG. 8A is a schematic diagram exemplifying a display screen on which the operation screen of the telephone function and an operation screen of a media print function are concurrently displayed in the embodiment according to one or more aspects of the present invention.

For example, when the Media Print button BT2 is pressed in the function selecting screen as shown in FIG. 7D, the media print function is executed by the MFP 1, and as shown in FIG. 8A, an operation screen of the media print function is displayed in the second area where the function selecting screen has been displayed.

FIG. 8A is a schematic diagram exemplifying a display screen on which the operation screen of the telephone function and the operation screen of the media print function are concurrently displayed. As illustrated in FIG. 8A, the operation screen of the telephone function already in execution is displayed in the first area of a smaller area size, while the operation screen of the media print function is displayed in the second area of a lager area size. It is noted that the operation screen displayed in the second area is provided with the other-function-usage button TB and a screen switching button GB for switching the area sizes of the operation screens.

When a plurality of functions (the telephone function and media print function) are concurrently executed, the respective operation screens of the functions in execution (the telephone function and media print function) are displayed on the LCD 16 at the same time. Therefore, the MFP 1 configured as above in the present embodiment is more user-friendly because the user can visually recognize the operation screens of the functions in execution more easily than such a configuration that the operation screens of all the functions (the telephone function, facsimile function, PC print function, media print function, scanner function, and copy function) are previously displayed on the LCD 16.

In particular, when an area size of the display screen of the LCD 16 is limited, an operations screen of each function can be displayed with a larger size in the case where each time a function is newly executed, operation screens of the newly executed function and a function already in execution are concurrently displayed, than the case where the operation screens of all the functions are previously displayed. Hence, the MFP 1 configured as above in the present embodiment is more convenient because the user can visually recognize the operation screen of each function more easily. Additionally, since the operation screen of the newly executed function (the media print function) is displayed in the larger-sized second area, it is convenient for the user to be able to operate the newly executed function on the large easily-viewable operation screen.

Then, in the operational status flag memory 13*a*, the operational status flag of the media print function is set to "1 (unexecutable)." Since the media print function uses the printer 21, the media print function is not concurrently executed along with the PC print function or the copy function. Accordingly, the operational status flags of the other functions (the PC print function and copy function) using the printer 21 are set to "1 (unexecutable)." Namely, except for the operational status flag of the scanner function, all the operational status flags are set to "1."

Back to the flowchart in FIG. 5, when the step S15 is completed, it is determined whether the user presses the screen switching button GB (S16). When the screen switching button GB is not pressed (S16: No), the present process skips S17 and goes to S18. Meanwhile, when the screen switching button GB is pressed (S16: Yes), the operation screen displayed in the first area on the LCD 16 is switched with the operation screen displayed in the second area (S17).

Thus, when a plurality of functions are concurrently executed, the user can display an operation screen of either one of the plurality of functions in the second area by pressing the screen switching button GB. Thereby, it is convenient for the user to be able to display an operation screen of a desired function in the second area and operate the desired function on the large easily-viewable operation screen.

Then, it is determined whether one of the functions in execution is terminated (S18). When one of the functions in execution is terminated (S18: Yes), a single function is only executed in the MFP 1, and the operation screen of the function in execution is displayed on the whole screen of the LCD 16 (S19). Accordingly, when a plurality of functions are concurrently executed, and then a function in execution is terminated, the operation screen of the terminated function is deleted from on the LCD 16, and the function in execution is widely displayed. Thus, it is convenient for the user to be able to operate the function in execution on the operation screen thereof widely displayed in an easily viewable manner.

Next, in the operational status flag memory 13*a*, operational status flags of the terminated function and functions executable concurrently with the function in execution are set to "0" (S20). Then, the present process goes back to S8, and the steps of S8 to S20 are repeatedly performed. In the step S18, when any function in execution is not terminated, namely, the two functions are in execution (S18: No), it is determined whether the user presses the other-function-usage button TB (S21). When the other-function-usage button TB is not pressed (S21: No), the present process goes back to S16, and the steps of S16 to S21 are repeatedly performed.

Meanwhile, when the other-function-usage button TB is pressed (S21: Yes), the first area is evenly sectioned into two areas (a third area and a fourth area). Then, an operation screen of a function in execution that has been executed earlier is displayed in the third area. In addition, an operation screen of a function in execution that has been executed later is displayed in the fourth area. Further, the function selecting screen is displayed in the second area (S22). Depending on information on the operational status flag memory 13*a*, in the function selecting screen, buttons of executable functions and buttons of functions unexecutable concurrently with the functions in execution are displayed in respective manners different therebetween (S23).

For instance, as illustrated in FIG. 8A, when the telephone function and the media print function are executed in the MFP 1, and the other-function-usage button TB is pressed by the user, the screen of the LCD 16 is sectioned, and the operation screens of the telephone function and the media print function, and the function selecting screen are displayed at the same time.

Figure 8B:
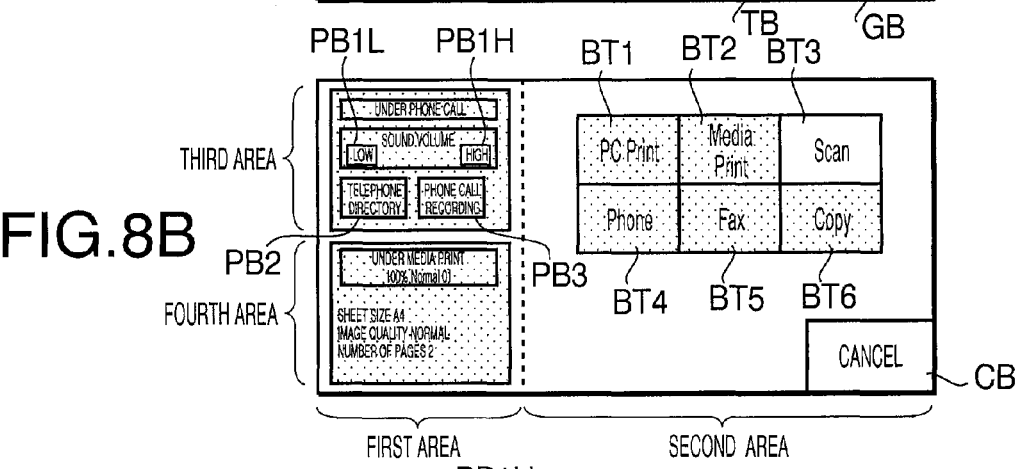
FIG. 8B is a schematic diagram exemplifying a display screen on which the operation screens of the telephone function and the media print function and the function selecting screen are concurrently displayed in the embodiment according to one or more aspects of the present invention.

FIG. 8B is a schematic diagram exemplifying a display screen on which the operation screens of the telephone function and media print function and the function selecting screen are displayed at the same time. As illustrated in FIG. 8B, the first area is evenly sectioned into the third area and the fourth area. The operation screen of the telephone function that has been executed earlier is displayed in the third area, the operation screen of the media print function that has been executed later is displayed in the fourth area, and the function selecting screen is displayed in the second area.

Even though the operation screens of the two functions (the telephone function and media print function) are being displayed, namely, the two functions are in execution, the user can concurrently display the operation screens of the two functions (the telephone function and media print function) in execution and the function selecting screen on the LCD 16. Thus, the MFP 1 configured as above in the present embodiment is convenient.

Then, the status of the operational status flag of each function stored on the operational status flag memory 13a is read, and it is determined whether each function is executable. Specifically, the function (scanner function) of which the operational status flag is set to "0 (executable)" is determined to be executable. On the function selecting screen displayed in the second area, the Scan button BT3 of the executable function (the scanner function) and the buttons BT1, BT2, and BT4 to BT6 of the functions (the PC print function, media print function, telephone function, facsimile function, and copy function) unexecutable concurrently with the function in execution are displayed in respective manners different therebetween.

Accordingly, it is convenient for the user to be able to visually recognize the executable function and the unexecutable functions at a glance by confirming how the buttons BT1 to BT6 are displayed. In addition, since the function selecting screen is displayed in the larger-sized second area, the user can confirm the executable and the unexecutable functions and select a function to be newly executed on with the large easily-viewable function selecting screen. Thus, the MFP 1 configured as above in the present embodiment is user-friendly.

Back to the flowchart in FIG. 5, when the step S23 is completed, it is determined whether a function to be executed is selected by the user pressing one of the buttons of the executable functions (S24). When the cancel button CB is pressed by the user and to select a function is canceled, or any function to be executed is not selected after a predetermined time period (e.g., 30 seconds) has elapsed (S24: No), the present process goes back to S16, and the aforementioned steps of S16 to S24 are repeatedly performed.

Meanwhile, when a function to be executed is selected by the user (S24: Yes), the function selected by the user is executed, and the operation screen of the selected function is displayed in the second area on the LCD 16 (S25). Then, in the operational status flag memory 13a, operational status flags of the newly executed function and functions unexecutable concurrently with the newly executed function are set to "1" (S26).

Figure 8C:
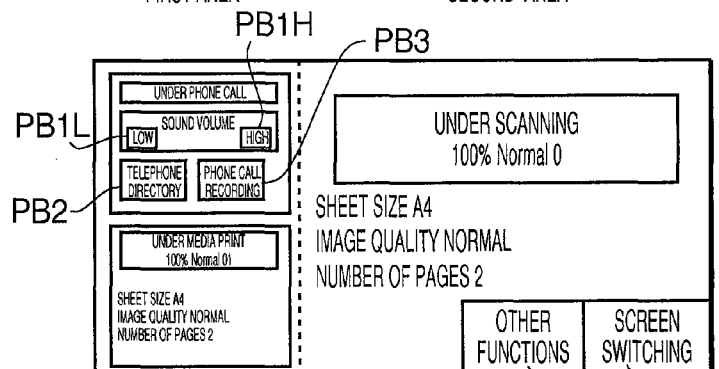
FIGS. 8C and 8D are schematic diagrams exemplifying display screens on which the operation screens of the telephone function, the media print function, and a scanner function are concurrently displayed in the embodiment according to one or more aspects of the present invention.

For example, when the Scan button BT3 is pressed by the user on the function selecting screen as shown in FIG. 8B, the scanner function is executed by the MFP 1, and as shown in FIG. 8C, the operation screen of the scanner function is displayed in the second area in which the function selecting screen has been displayed.

FIG. 8C is a schematic diagram exemplifying a display screen on which the operation screens of the telephone function, the media print function, and the scanner function are displayed at the same time. As shown in FIG. 8C, the operation screen of the telephone function that has been executed earlier is displayed in the third area. Further, the operation screen of the media print function that has been executed later is displayed in the fourth area, and the operation screen of the scanner function is displayed in the second area. It is noted that an operation screen displayed in the second area is always provided with the other-function-usage button TB and the screen switching button GB.

Since the operation screen of the newly executed function (the scanner function) is displayed in the larger-sized second area, it is convenient for the user to be able to operate the newly executed function on the large easily-viewable operation screen.

Then, on the operational status flag memory 13a, the operational status flag of the scanner function is set to "1 (unexecutable)." Thus, the operational status flags of all the functions are set to "1 (unexecutable)." It is noted that the scanner function cannot be executed concurrently with the facsimile function or the copy function in which an image is scanned.

Back to the flowchart in FIG. 6, when the step S26 is completed, it is determined whether the screen switching button GB is pressed by the user (S27). When the screen switching button GB is not pressed by the user (S27: No), the present process skips S28 and goes to S29. Meanwhile, when the screen switching button GB is pressed (S27: Yes), the operation screen displayed in the third area on the LCD 16 is displayed in the second area. Further, the operation screen displayed in the second area is displayed in the fourth area, and the operation screen displayed in the fourth area is displayed in the third area (S28).

Figure 8D:
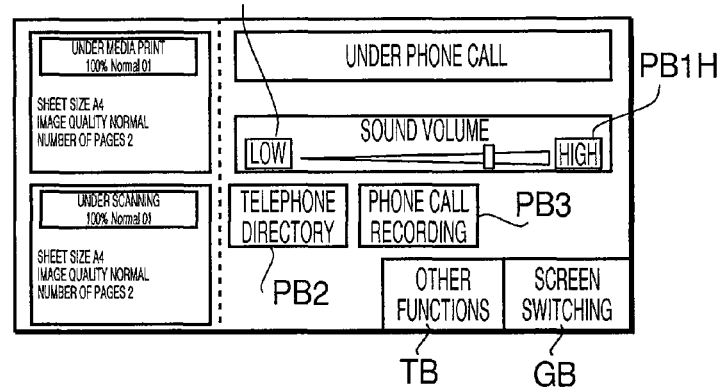

For example, when the screen switching button GB is pressed by the user on the operation screen as shown in FIG. 8C, as shown in FIG. 8D, the operation screen of the telephone function displayed in the third area on the LCD 16 is displayed in the larger-sized second area. Further, the operation screen of the scanner function displayed in the second area is displayed in the fourth area, and the operation screen of the media print function displayed in the fourth area is displayed in the third area.

Accordingly, when a plurality of functions are concurrently executed, the user can display an operation screen of any one of the plurality of functions in the second area by pressing the screen switching button GB. In other words, it is convenient for the user to be able to display an operation screen of a desired function in the larger-sized second area and operate the desired function on the large easily-viewable operation screen.

Back to the flowchart in FIG. 6, when the step S27 or S28 is completed, it is determined whether any one of the functions in execution is terminated (S29). When any one of the functions in execution is not terminated (S29: No), the present process goes back to S27, and the steps of S27 to S29 are repeatedly performed. Meanwhile, when any one of the functions in execution is terminated (S29: Yes), it is determined whether the function of which the operation screen has been displayed in the second area on the LCD 16 is terminated (S30).

In S30, when the function of which the operation screen has been displayed in the second area is terminated (S30:

Yes), the operation screen displayed in the fourth area on the LCD 16 is displayed in the second area, and the operation screen displayed in the third area is displayed in the first area (S31). Meanwhile, when the function of which the operation screen has been displayed in the second area is not terminated (S31: No), an operation screen of a function in execution between the operation screens that have been displayed in the third and fourth areas is displayed in the first area (S32). Namely, the operation screen of the function terminated is deleted from on the LCD 16, the operation screen of the function in execution is widely displayed. Thus, it is convenient for the user to be able to operate the function in execution on the operation screen widely displayed in an easily viewable manner.

Then, in the operational status flag memory 13*a*, the operational status flags of the terminated function and functions executable concurrently with the function in execution are set to "0" (S33). Thereafter, the present process goes back to S16, and the aforementioned steps of S16 to S33 are repeatedly performed.

Figure 9A:
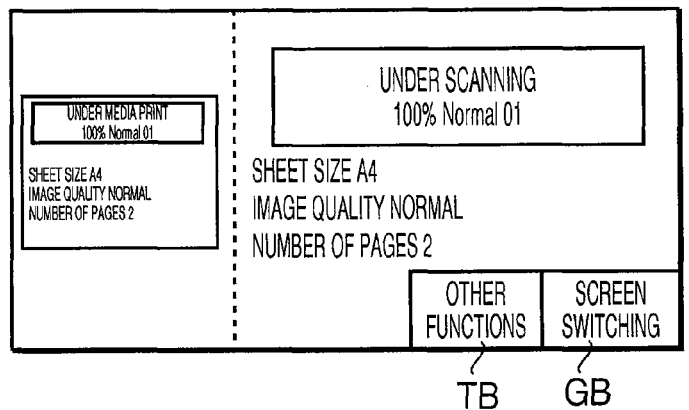
FIG. 9A is a schematic diagram exemplifying a display screen on which the operation screen of the media print function is displayed in a first area and the operation screen of the scanner function is displayed in a second area in the embodiment according to one or more aspects of the present invention.

For instance, on the operation screen as shown in FIG. 8D, when the telephone function in execution is terminated, as illustrated in FIG. 9A, firstly, the operation screen of the telephone function displayed in the second area is deleted. Then, the operation screen of the scanner function displayed in the fourth area is displayed in the larger-sized second area. Further, the operation screen of the media print function displayed in the third area is displayed in the first area.

After that, in the operational status flag memory 13*a*, the operational status flag of the telephone function terminated is set to "0 (executable)." In this case, a function executable concurrently with the functions in execution (the media print function and the scanner function) is only the telephone function. Therefore, the operational status flags of the other functions are not changed.

Figure 9B:
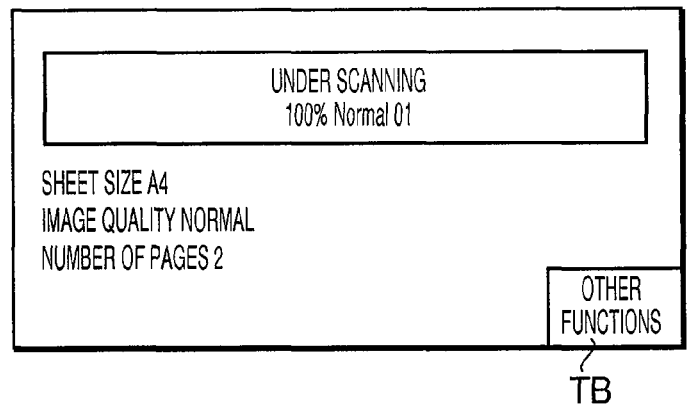
FIG. 9B is a schematic diagram exemplifying a display screen on which the operation screen of the scanner function is displayed in a whole area in the embodiment according to one or more aspects of the present invention.

When the media print function is terminated, as shown in FIG. 9B, the operation screen of the media print function displayed in the first area is deleted. The operation screen of the scanner function displayed in the second area is displayed on the whole screen of the LCD 16.

In the operational status flag memory 13*a*, the operational status flag of the media print function terminated is set to "0 (executable)." In this case, except for the media print function, a function executable concurrently with the function in execution (the scanner function) is only the PC print function. Therefore, the operational status flag of the PC print function is set to "0 (executable)."

Subsequently, when the scanner function is terminated, the standby screen as shown in FIG. 7A is displayed on the LCD 16. Additionally, in the operational status flag memory 13*a*, the operational status flag of the scanner function terminated is set to "0 (executable)." Further, the operational status flags of the other functions (the facsimile function and the copy function) that have been set to "1" is set to "0 (executable)."

Thus, in the main process represented by the flowcharts in FIGS. 4 to 6, each time the user executes another function that has no influence on a function in execution, the operation screens of the executed function and the function already in execution are concurrently displayed on the LCD 16. Further, when a plurality of functions are in execution, and a function is terminated, the operation screen of the terminated function is deleted from on the LCD 16, and the operation screen of each function in execution is displayed with a larger size.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

In the aforementioned embodiment, the screen of the LCD 16 is sectioned into two of the first area and the second area, or into three of the second area, the third area, and the fourth area. However, each time a function is newly executed, the screen of the LCD 16 may repeatedly be sectioned, and operation screens of three or more functions may concurrently be displayed on the LCD 16.

Further, depending on the recyclability, the feeding operation by the automatic document feeding unit 7 may be stopped. Hereinafter, such a paper segregation process will be described with reference to FIGS. 7 and 8.

Figure 9C:
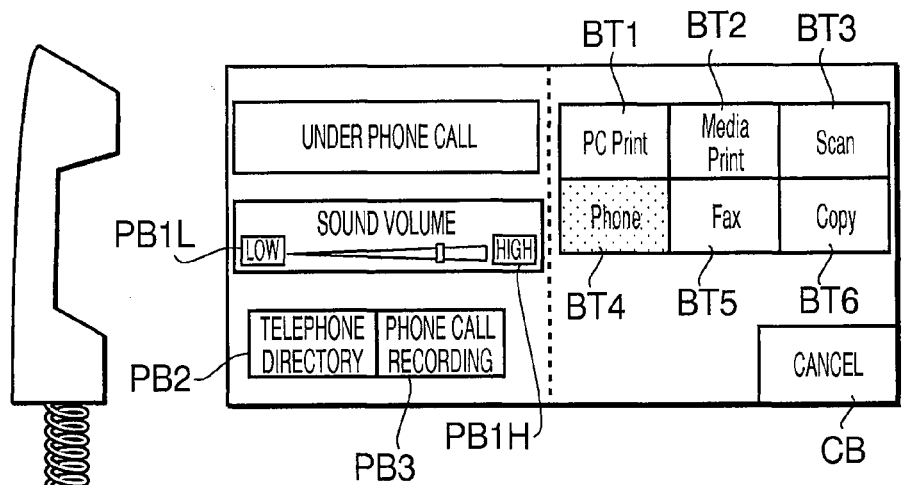
FIG. 9C is a schematic diagram exemplifying a display screen on which the operation screen of the telephone function and the function selecting screen are concurrently displayed in respective evenly-sectioned areas in a modification according to one or more aspects of the present invention.

In the aforementioned embodiment, the screen of the LCD 16 is sectioned into the first area (the third area and the fourth area) of a smaller area size and the second area of a larger area size. However, as illustrated in FIG. 9C, the screen of the LCD 16 may be sectioned into two areas of the same area size. In addition, each time a function is newly executed, the screen of the LCD 16 may repeatedly be sectioned. In this case, since when the screen of the LCD 16 of a limited size is repeatedly sectioned, it is harder for the user to visually recognize information displayed in the sectioned areas, the number of the sectioned areas on the LCD 16 may be limited.

In the aforementioned embodiment, when the screen of the LCD 16 is sectioned, operation screens of executed functions are displayed in the respective sectioned areas in accordance with an order in which the functions have been executed. However, when the telephone function is used, as shown in FIG. 9C, the operation screen of the telephone function may be displayed in a sectioned area at a side where the handset 22 is provided or in the nearest sectioned area to a position where the handset 22 is provided. It is convenient for the user to be able to visually recognize information and operate the function on the operation screen of telephone function in an easy manner when the user performs voice communication through the handset 22.

What is claimed is:

1. A multi function peripheral having a plurality of functions, comprising:
   a function selecting unit configured to accept therethrough an input to select a function to be executed from the plurality of functions;
   a display unit configured to display thereon one or more information screens concerning the plurality of functions, the display unit being configured to be divided into:
   a first area configured to be further divided into a plurality of areas so as to display one or more information screens; and
   a second area that is larger than the first area and is configured to display a single information screen without being further divided to display other information screens for selected functions;
a display control unit configured to control the display unit to:
when a first function is selected through the function selecting unit, display thereon a first information screen showing information on the first function;
each time a function is selected through the function selecting unit, display an information screen showing information on the selected function; and
when a plurality of functions are concurrently executed, display an information screen corresponding to one of the plurality of functions on the second area and display information screens corresponding to the other functions of the plurality of functions on the first area;
a first determining unit configured to, when the first function is selected, determine whether there is a function in execution that is different from the first function,
wherein the display control unit is further configured to control the display unit to:
when the first determining unit determines that there is not a function in execution that is different from the first function when the first function is selected, display the first information screen without displaying information on the other of the plurality of functions on the display unit; and
when the first determining unit determines that there is a second function in execution that is different from the first function when the first function is selected, display the first information screen concurrently with a second information screen showing information on the second function in execution;
a second determining unit configured to determine whether execution of the function selected through the function selecting unit is ended; and
a third determining unit configured to, when the second determining unit determines that execution of the function selected through the function selecting unit is ended, determine whether an information screen corresponding to the function of which execution is determined to be ended is displayed on the first area or on the second area,
wherein the display control unit is further configured to control the display unit to:
when the third determining unit determines that the information screen corresponding to the function of which execution is determined to be ended is displayed on the first area, delete, from a whole area of the display unit, the information screen corresponding to the function of which execution is determined to be ended; and
when the third determining unit determines that the information screen corresponding to the function of which execution is determined to be ended is displayed on the second area, delete from the whole area of the display unit, the information screen corresponding to the function of which execution is determined to be ended, and display, on the second area, one information screen of the one or more information screens displayed on the first area.

2. The multi function peripheral according to claim 1,
wherein the display control unit controls the display unit to display thereon one of information screens to be displayed, with a larger size than the other.

3. The multi function peripheral according to claim 2,
wherein the display control unit controls the display unit to display thereon the first information screen with a larger size than the second information screen.

4. The multi function peripheral according to claim 2, further comprising a screen size changing unit configured to accept therethrough a screen size changing instruction,
wherein, each time the screen size changing instruction is accepted through the screen size changing unit, the display control unit controls the display unit to change an information screen displayed thereon with a larger size to a smaller-sized information screen and change an information screen displayed thereon with a smaller size to a larger-sized information screen.

5. The multi function peripheral according to claim 1, further comprising:
a storage unit configured to store thereon discrimination data for discriminating an executable function which is executable concurrently with the second function in execution from an unexecutable function which is unexecutable concurrently with the second function in execution; and
a display instructing unit configured to accept therethrough an instruction to specify the executable function,
wherein the display control unit controls the display unit to display thereon a function selecting screen for specifying the executable function based upon the discrimination data stored on the storage unit, in response to the instruction to specify the executable function being accepted through the display instructing unit.

6. The multi function peripheral according to claim 5, further comprising an executed function termination determining unit configured to determine whether a function in execution is terminated,
wherein the storage unit stores thereon the discrimination data until the executed function termination determining unit determines that the function in execution is terminated.

7. The multi function peripheral according to claim 5,
wherein the function selecting screen shows thereon the executable function and the unexecutable function in respective different manners.

8. The multi function peripheral according to claim 7,
wherein the display control unit controls the display unit to display thereon the function selecting screen concurrently with the second information screen of the second function in execution, in response to the instruction to specify the executable function being accepted through the display instructing unit.

9. The multi function peripheral according to claim 8,
wherein the display control unit controls the display unit to display thereon the function selecting screen with a larger size than the second information screen, in response to the instruction to specify the executable function being accepted through the display instructing unit.

10. The multi function peripheral according to claim 1, further comprising a fourth determining unit configured to determine whether the second function in execution is terminated,
wherein, when the fourth determining unit determines that the second function in execution is terminated, the display control unit controls the display unit to delete therefrom the second information screen of the function terminated, and wherein the display control unit controls the display unit to display a different information screen being displayed thereon, with a larger size than a current size.

11. A method to control a multi function peripheral having a display unit, comprising:
- dividing the display unit into a first area to display one or more function screens and a second area that is larger than the first area, the second area being configured to display a single information screen without being further divided to display other information screens for selected functions, the first area being further divided into a plurality of areas so as to display the one or more information screens;
- receiving a selection of a function to be executed from a plurality of functions of the multi function peripheral;
- each time a function is selected, displaying thereon an information screen showing information on the selected function,
- when a plurality of functions are concurrently executed, displaying an information screen corresponding to one of the plurality of functions on the second area and displaying information screens corresponding to the other functions of the plurality of functions on the first area;
- determining whether there is an function in execution that is different from a first function selected from among the plurality of functions when the first function is selected;
- displaying a first information screen showing information on the first function selected from among the plurality of functions without displaying information on the other of the plurality of functions on the display unit when it is determined that there is not a function in execution that is different from the first function when the first function is selected;
- displaying, on the display unit which is displaying a second information screen showing information on the second function in execution, the first information screen concurrently with the second information screen, when it is determined that there is a second function in execution that is different from the first function when the first function is selected;
- determining whether execution of the selected function is ended;
    - when determining execution of the selected function is ended, determining whether execution of a function corresponding to the information screen displayed on the second area is ended,
    - when determining execution of the function corresponding to the information screen displayed on the second area is not ended, deleting, from the first area the information screen corresponding to the function determined that execution thereof is ended, and
    - when determining execution of the function corresponding to the information screen displayed on the second area is ended, deleting, from the second area, the information screen corresponding to the function determined that execution thereof is ended, and displaying, on the second area, one of the one or more information screens displayed on the first area.

12. The multi function peripheral according to claim 1, wherein when the first determining unit determines that the second function and a third function are in execution when the first function is selected, the display control unit moves an information screen corresponding to one of the second and third functions from the second area to the first area, and displays the first information screen in the second area, wherein the second information screen and a third information screen showing information on the third function are displayed in the first area.

13. The multi function peripheral according to claim 12, further comprising a fifth determination unit configured to determine whether the second function or third function in execution is terminated,
- wherein, when the fifth determining unit determines that the second function or third function in execution is terminated, the display control unit controls the display unit to delete therefrom the second or the third information screen corresponding to the function in execution that is determined to be terminated from the first area, and
- wherein the display control unit controls the display unit to display the other information screen of either the second or third information screen in a larger size in the first area.

14. The method to control a multi function peripheral having a display unit according to claim 11, wherein the first information screen is displayed in the second area.

15. The multi function peripheral according to claim 1, further comprising a screen switching element displayed on the display unit, the screen switching element being smaller in size than each information screen displayed on the first area, the screen switching element configured to, when operated, switch display areas on the display unit between one of the one or more information screens displayed on the first area and an information screen displayed on the second area, wherein the information screen displayed on the second area is displayed on the first area while one of the one or more information screens displayed on the first area is displayed on the second area.

16. The multi function peripheral according to claim 1, further comprising a different-function-usage element displayed on the display unit, the different-function-usage element being smaller in size than each information screen displayed on the first area, the different-function-usage element configured to, when operated, display a function selecting screen on the second area while displaying on the first area, an information screen displayed on the second area.

* * * * *